A. H. FISHER.
TIRE WRAPPING MACHINE.
APPLICATION FILED DEC. 23, 1913.
1,265,640.
Patented May 7, 1918.
3 SHEETS—SHEET 2.
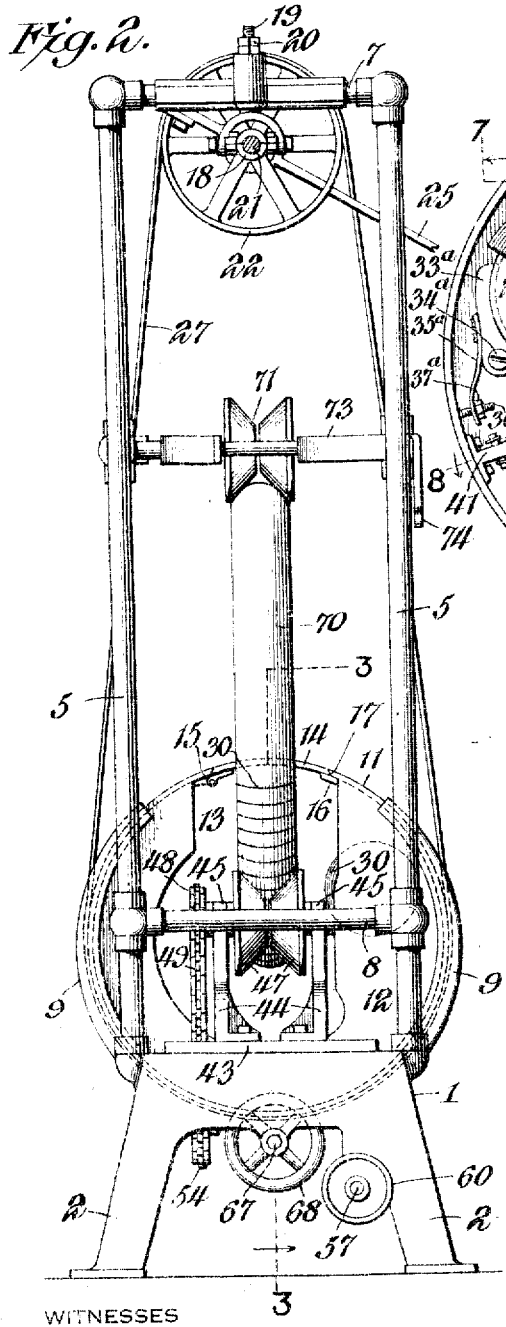
Fig. 2.
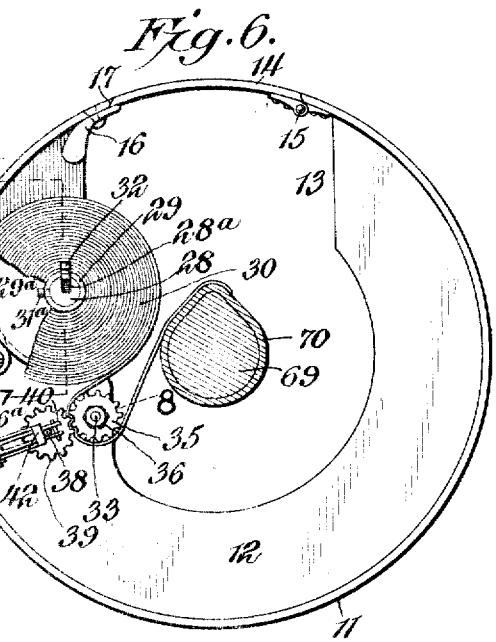
Fig. 6.
Fig. 7.
Fig. 9.
WITNESSES
Howard D. Orr.
F. T. Chapman.
Albert H. Fisher, INVENTOR,
BY E. G. Siggers
ATTORNEY

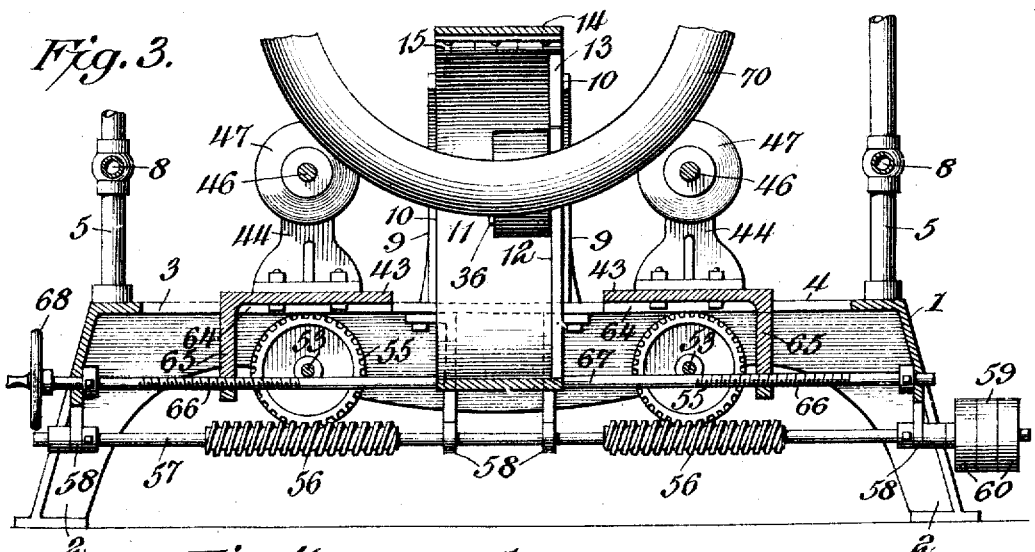
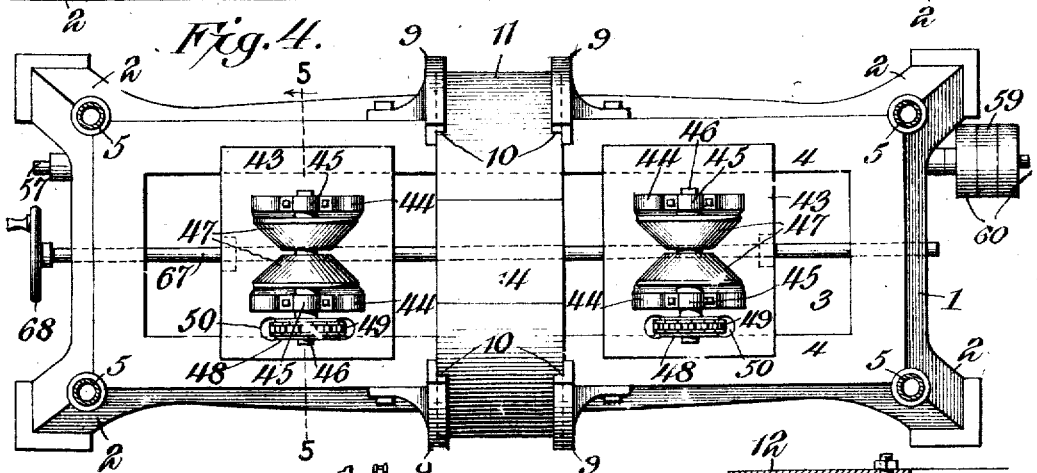
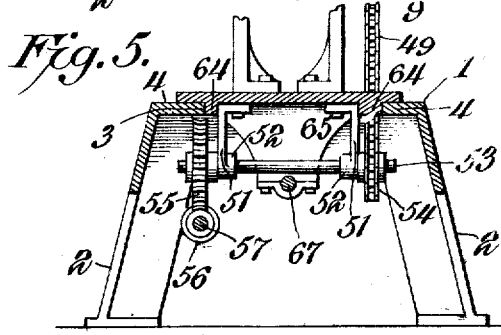
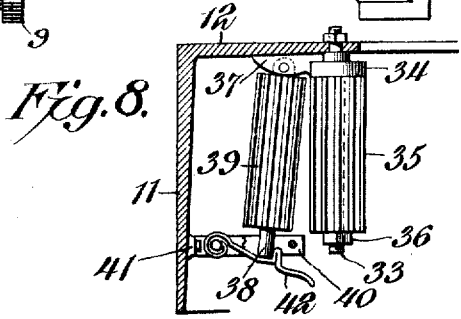

UNITED STATES PATENT OFFICE.

ALBERT H. FISHER, OF LINCOLN, NEBRASKA.

TIRE-WRAPPING MACHINE.

1,265,640.　　　　　Specification of Letters Patent.　　Patented May 7, 1918.

Application filed December 23, 1913. Serial No. 808,426.

*To all whom it may concern:*

Be it known that I, ALBERT H. FISHER, a citizen of the United States, residing at Lincoln, in the county of Lancaster and State of Nebraska, have invented a new and useful Tire-Wrapping Machine, of which the following is a specification.

This invention has reference to improvements in machines for wrapping automobile tires in the course of manufacture, and its object is to provide a machine by means of which the wrapping may be performed expeditiously and more effectively than hand wrapping.

In the course of manufacture of automobile tires the first process is to stretch plies of rubberized fabric on an iron form or core, a suitable number of plies being employed to reach the desired thickness, and then this body or carcass is wrapped around and around with a strip of damp cloth of about two or three inches in width. The object of the cloth is to hold the plies of rubberized fabric, usually canvas, tightly together while the body or carcass is passed through the sticking or vulcanizing process, after which the strip of cloth constituing the bandage is removed and the carcass is then ready for the application of the cushion and tread. Some manufacturers apply the tread by pressing into molds, and others by wrapping in the manner just described, thus producing either a molded or a wrapped tread in accordance with the method of manufacture.

It is necessary in wrapping tires for vulcanizing that the wrapping or bandage be bound around the tire very tightly, so that the plies of fabric are pressed closely together when the heat is applied and the rubber compound is softened. For this purpose it is obligatory that means be provided whereby the strip of fabric constituting the bandage is under strong tension during the wrapping process, and provision must be made for the application of the requisite power for the purpose.

In accordance with the present invention there is provided a rotatable shuttle carrying the bandage strip in the form of a roll and this bandage strip is wound around and around the carcass of the tire while mounted upon a core in such manner that each turn of the bandage slightly overlaps the next preceding one until the entire tire is thus wound, and then as is customary the bandage is counter-wound about the tire, so that there is produced a second layer with the turns crossing those of the first layer, the bandage being wet or damp when applied.

In order to produce the requisite tension the shuttle is provided with tensioning means for the bandage so arranged that a constant tension of any desired degree may be applied to the bandage strip while it is being wound upon the tire. Moreover, the invention contemplates the employment of a shuttle with driving means therefor so arranged as to support the shuttle in a manner to relieve guides provided for the shuttle from the weight thereof, wherefore the shuttle is in effect a floating shuttle and wear upon the guides is reduced to a minimum. Again, provision is made by the present invention for the support of the tire and core, the said core with the tire carcass thereon being rotated about the axis of generation of the core, which core moves through the shuttle coincident with the axis of generation thereof, both the core and shuttle rotating about their respective axes, the shuttle at a relatively high rate of speed and the core at a relatively low rate of speed. The core is provided with positive driving supports which may be adjusted to take any cores and carcasses thereon of different sizes, while a retaining member or floating guide is provided to automatically adjust itself to cores and tires thereon of different sizes, but which will hold the core to its driving members at all times.

The invention will be best understood from a consideration of the following detailed description, taken in connection with the accompanying drawings forming a part of this specification, with the further understanding that while the drawings show a practical embodiment of the invention, the latter is not confined to any strict conformity with the showing of the drawings, but may be changed and modified so long as such changes and modifications mark no material departure from the salient features of the invention.

In the drawings:—

Fig. 2 is an end elevation thereof.

Fig. 3 is a section on the line 3—3 of Fig. 2.

Fig. 4 is a section on the line 4—4 of Fig. 1, the driving belts being omitted.

Fig. 5 is a section on the line 5—5 of Fig. 4 with some parts omitted.

Fig. 6 is an elevation of the shuttle with the core simply indicated to show its relative position.

Fig. 7 is a section on the line 7—7 of Fig. 6.

Figure 1:
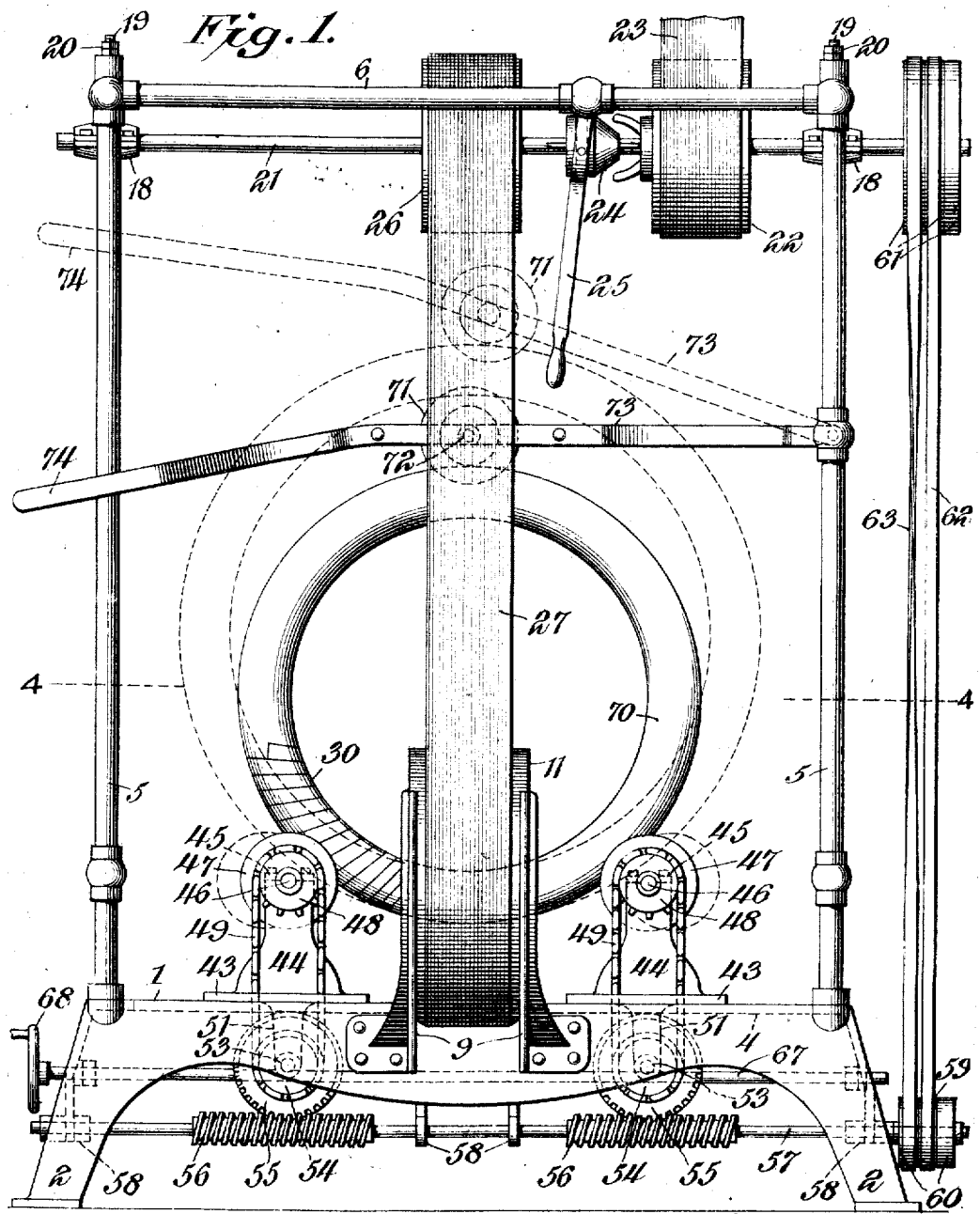
Figure 1 is a side elevation of a structure embodying the present invention.

Fig. 8 in a section on the line 8—8 of Fig. 6.

Fig. 9 is a perspective view of a sleeve or spool shown in Figs. 6 and 7.

Referring to the drawings, there is shown a base member 1 provided with legs 2 by which the top of the base member is elevated an appropriate distance above a support. The base member 1 is shown as somewhat elongated as compared to its width, and through the top of the base member is an elongated opening 3 flanked by ledges 4.

At the corner portions of the base member there are erected posts 5 joined together at the top by longitudinal connecting members 6 and end members 7 and wherever convenient or needed cross members 8 are provided to add rigidity to the frame. For convenience and lightness the frame erected on the base member may be of tubular metal, but any other appropriate construction may be used.

Fast to opposite sides of the base member about midway of its length are spaced guides 9 each formed with a guide channel 10 curved upon the arc of a circle so as to receive and guide a cylindrical or ring-shaped shuttle 11. The guides 9 are so disposed as to engage the shuttle at opposite edges both diametrically and axially, wherefore the shuttle may turn in the guides about the axis of generation of the shuttle, which, therefore, becomes its axis of rotation, while movement lengthwise of the axis of the shuttle is prevented by engagement of the guides with the corresponding edges of the shuttle.

The shuttle is relatively wide on its periphery, while at one end it is formed with an inwardly directed flange 12, the continuity of which is broken at one point by a gap 13, while the continuity of the peripheral portion of the shuttle is also broken at a corresponding point, but is made complete by a door or gate 14 connected to the body of the shuttle at one end by a hinge 15 and at the other end controlled by a latch 16 holding the gate shut when the latch is in one position, and releasing it to open inwardly of the shuttle when in another position. In order to limit the closing movement of the gate so as to bring its outer surface into coincidence with the outer surface of the shuttle when the gate is closed, the ends of the gate and the corresponding portions of the peripheral part of the shuttle are beveled as indicated at 17, thus forming coacting shoulders preventing the gate from moving outwardly beyond the determined peripheral surface of the shuttle.

The end cross pieces 7 of the frame mounted on the base carry bearings 18 which may be of hanger type supported by threaded rods 19 controlled by nuts 20 so that the bearings are susceptible of a certain amount of adjustment up and down. Mounted in these bearings is a shaft 21 which when the machine is in operation is substantially horizontal, and carried by the shaft is a drive pulley 22 receiving power from a belt 23 coming from any source of power, or the pulley 22 may represent a direct drive electric motor.

The pulley 22 is not made permanently fast to the shaft 21, but is arranged to be coupled thereto or uncoupled therefrom through the intermediary of a clutch 24, the structure of which need not be entered into here, since it may follow any approved type. By means of the clutch 24 the pulley 22 is coupled to or uncoupled from the shaft 21 at the will of an operator, a suitable handle or lever 25 being provided for the purpose.

Mounted on the shaft 21 fast thereto is another pulley 26 and this pulley carries a belt 27 underriding the shuttle 11. The pulley 26 is arranged so as to be directly over the shuttle 11 and by having the belt 27 of appropriate length and by a suitable adjustment of the bearings 18 the shuttle is in most part sustained by the belt in such manner that its weight is not supported by the guides 9, wherefore the latter act solely as guides, and the shuttle becomes in effect a floating shuttle of which very little, if any, of the weight is borne by the guides 9 and nearly or quite all of the weight is sustained by the belt 27. Moreover, this belt is relatively wide and the shuttle is comparatively heavy, so that while the frictional-engagement of the belt depends almost wholly or quite entirely upon the weight of the shuttle, such frictional engagement has been found in practice to be ample to cause the rotation of the shuttle against any resistance due to the action of the shuttle. Since the guides 9 act principally as guides and not as supports, there is almost no wear upon them and their life is greatly prolonged, and the same is true of the shuttle, which latter may be driven at high speed.

Formed on or secured to the body or flange 12 is a spindle 28 designed to receive a sleeve 29 carrying a roll of tape or bandage 30 in the form of a long strip of suitable fabric, which may be termed wrapping tape, two or three inches in width. The spindle 28 is formed with an elongated groove 28ª in which is secured one end of a spring 31, while the other end of this spring is formed into a latch head 32 normally extending into obstructing relation to and preventing the sleeve 29 from accidentally escaping from the spindle 28. At the same time no interference is presented to the rotation of the sleeve with the wound tape thereon about the spindle 28.

Mounted on the flange 12 of the shuttle 10 in appropriately close relation to the spindle 28 is another spindle 33 carrying a head or abutment 34 close to the rim of the shuttle 11, and mounted on this spindle is a toothed tension roller or drum 35 held to the spindle by a nut 36. The head 34 may be made of leather or some other friction material so that by screwing up the nut 36 to an appropriate extent the toothed tension drum 35 may be frictionally held against rotation to any desired extent. To a web 37 on the inner wall of the flange 12 there is hinged another spindle 38 carrying loosely a toothed roller or drum 39 matching the drum 35 and so related thereto that the tape 30 may be passed between the two rollers, whereupon the teeth of one roller will force the band into the spaces between the teeth of the other roller, so that the band in traveling between the rollers will turn them and the force necessary to draw the band through the rollers is proportionate to the resistance offered by the frictional holding members of the drum or roller 35. The spindle 38 at the end remote from its hinged end extends through the bifurcated end 40 of a bracket 41 mounted on the rim of the shuttle 11 and this bracket carries a spring latch 42 shaped to engage on one side or the other of the spindle 38 to hold the drum 39 in operative relation to the drum 35 or at a sufficient distance away therefrom to permit the ready passage of the tape 30 between the two drums constituting the tension members of the shuttle.

To prevent the tape from unwinding from the sleeve or spool 29 faster than it is taken up by the tension drums, there is provided a disk 29ª having a peripheral groove 30ª, this disk being mounted to rotate on the spindle 28 close to the flange 12. The hub portion of the disk 29ª has lugs or projections 31ª positioned to enter notches 32ª in the corresponding end of the sleeve 29 so that the disk and sleeve are then locked together. A brake shoe 33ª is pivoted to the flange 12 by a screw 34ª or otherwise. Fast to the shoe 33ª is one end of a spring 35ª, the other end of which is traversed by a threaded stud 36ª projecting from the shuttle 11 and a nut 37ª determines the tension of the spring and thereby the pressure of the brake shoe on the disk 29ª, thus preventing a too rapid unwinding of the tape going to the tension drums 35.

Mounted on the ledges 4 of the base 1 on opposite sides of the shuttle are carriages 43 each provided with uprising standards 44 spaced apart laterally of the base and at their upper ends formed with bearings 45 for a shaft 46 carrying between the standards two frusto conical or similarly shaped rollers 47 fast to the shaft and with their smaller ends presented one toward the other. Each shaft 46 carries beyond one of the standards 45 a sprocket wheel 48 and engaging this sprocket wheel there is a sprocket chain 49 dropping through a slot 50 in the carriage 43.

Depending from the under side of the carriage 43, which is in the main in the form of a plate, are brackets 51 each terminating at its lower end in a journal bearing 52 for a shaft 53 parallel with the shaft 46. At one end the shaft 53 carries a sprocket wheel 54 engaged by the sprocket chain 49 and at the other end this shaft carries a worm wheel 55 meshing with a worm 56 on a shaft 57 appropriately located below the top of the base and supported by the base through the intermediary of journal bearings 58 at appropriate points. At one end the shaft 57 carries tight and loose pulleys 59, 60, there being three such pulleys, while a similar number of tight pulleys 61 are carried by the shaft 21. A straight belt 62 and a crossed belt 63 connect the two sets of pulleys so that in one position of the belts the shaft 21 will drive the shaft 57 in one direction, while in the other position of the belts the shaft 57 is driven in the opposite direction. The arrangement is such that power from the shaft 21 causes a rotation of the shaft 57 to in turn cause the worms 56 to drive the worm wheels 55, and thereby the shafts 53 and the sprocket wheels 54 on these shafts drive the shafts 46 and rollers 47 mounted thereon by way of the sprocket chains 49 and sprocket wheels 48, the direction of rotation of the two sets of rollers 47 being the same.

Each carriage 43 is formed on its under face with flanges or ribs 64 engaging the inner edges of the ledges 4 and thereby guiding the carriages, and formed on each carriage is a depending member 65 formed at the lower end with a nut for a threaded portion 66 of a shaft 67 mounted for rotation in suitable bearings in the base 1, and this shaft has a hand wheel or crank 68 at one end so that it may be rotated at will, while the threaded portions 66 are respectively right and left to cause a movement of the carriages 43 in opposite directions when the shaft 67 is rotated. This causes the approach or recession of the rollers 47 as may be desired.

The rollers 47 are designed to receive a core 69 with a bicycle tire carcass 70 thereon and when such a core is supported upon the rollers 47 at spaced points it is held thereto against tipping by a follower roller 71 in the form of a pair of frusto-conical members with their smaller ends toward each other and mounted for free rotation upon a rod or arbor 72 carried by a divided arm 73 pivoted at one end upon one of the cross members 8 of the main frame, and at the other end having a handle portion 74 within easy reach of an operator. The arrangement is such that the guide roller 71 constitutes a floating guide for the tire form with the carcass thereon, always holding it in proper relation to the supporting and driving rollers 47 and readily accommodating itself to different diameters of forms.

Let it be assumed that it is desired to wrap a tire carcass preparatory to vulcanization and already applied to the form, then the gate 14 is opened and the form with the carcass thereon is inserted through the gate until it rests upon the rollers 47 and by a suitable manipulation of the hand wheel 68 the carriages are adjusted so that the portion of the form passing through the shuttle 11 will be in the axis thereof.

A roll of tape 30 suitably dampened is applied to the spindle 28 and locked thereto by the latch 32 and one end of the tape 30 is made fast to the carcass upon the core 69 having been first threaded between the tension drums 35 and 39 and the roller 39 locked in place.

Now, the clutch 24 is closed, whereupon the shaft 21 begins to rotate causing a like rotation of the shuttle 11 at an appropriate speed, this being in actual practice about two hundred revolutions per minute, the belts 62 and 63 having been properly adjusted upon their respective pulleys.

The rollers 47 are driven at such speed that the core 69 with the carcass 70 is rotated at a speed permitting the wrapping of the tape 30 about the carcass to cause the turns of the tape to slightly overlap. The wrapping continues until the entire carcass has been covered by the bandage or wrapping tape, and then the belts 62 and 63 are shifted to reverse the direction of rotation of the core and carcass, whereupon the wrapping continues as before, but in the reverse direction with respect to the carcass, until two layers are wrapped upon the carcass as is customary.

The winding tape or bandage is placed upon the tire carcass much more tightly than can be done by hand and at the same time more expeditiously, the wrapping machine performing the work of several operators.

It is of great importance that the wrapping or bandage be applied very tightly and this is determined by the tension rollers 35 and 39. Moreover, the machine is readily adjusted for tires of different diameters and sizes of which there are a large number. The adjustment is quickly effected by a few turns of the shaft 67, the follower guide roller 71 automatically accommodating itself to the different sizes of tires and forms thereof.

Besides the adaptability of the machine to run at high speed it is practically noiseless in operation and has practically no gears to get out of order, the only gears in the whole machine being represented by the worm gears employed.

By supporting the shuttle by the belt so that it is in effect a floating shuttle not only is the wear reduced to a negligible minimum, but an abundance of power may be applied to the shuttle without undue wear, for it is advisable to employ a very tight tension on the tape or bandage, wherefore the tire is wrapped very tightly. Heretofore it has been found impracticable to tightly wrap tires by machines, and this is the reason why a large percentage of tires are being wrapped by hand in order that the wrapping may be sufficiently tight to provide good vulcanization. With the machine of the present invention, however, experience has shown that the wrapping is much better and more uniform than when wrapped by hand, while the output of the machine is equal to labor of quite a number of operatives doing the wrapping by hand, these statements being based upon the action of a commercial embodiment of the present invention in successful practical operation. A machine constructed substantially as shown in the drawings is in every day use, and in no instance has it done imperfect wrapping.

When it is desired to remove a wrapped tire with its core and substitute an unwrapped one, the tape or band is severed, the gate 14 is opened, and the follower guide roller 71 is lifted, whereupon the wrapped tire with its core may be removed and an unwrapped one substituted, and if it be of a different size the carriages 43 are quickly adjusted toward or from each other to accommodate the tire and its core so that the part to be wrapped passes through substantially the axis of the shuttle 11. This adjustment may be made while the machine is running, if necessary, for the follower guide roller 71 at once adjusts itself to any change in position of the core and tire carcass carried thereby.

A progressive movement of the tire carcass causes the wrapping to assume a helical form, and when the core is reversed in direction the helical wrapping also reverses, so that the over layer has the turns crossing those of the under or inner layer.

What is claimed is:—

1. In a tire wrapping machine, a rotatable shuttle, guides therefor shaped to restrict the movements of the shuttle to that of rotation, and a drive belt in underrunning sustaining relation to the shuttle and supporting the weight thereof.

2. In a machine for wrapping tires, a ring-shaped shuttle, edge guides therefor, a driving pulley above the shuttle and a belt extending about the pulley and shuttle in underriding relation to the latter and related to the shuttle to hold it suspended in the guides.

3. In a machine for wrapping tires, a ring-shaped shuttle, edge guides therefor, a driving pulley above the shuttle and a belt extending about the pulley and shuttle in underriding relation to the latter and related to the shuttle to hold it suspended in the guides, the pulley being mounted for up and down adjustment.

4. In a tire wrapping machine, a circular shuttle mounted for rotation upon a substantially horizontal axis, supporting and driving means for the core and tire carcass thereon and located at opposite ends of the shuttle above the lower run thereof to sustain the core and carcass in an upright position in traversing relation to the shuttle for rotation about a substantially horizontal axis, a guiding follower above the shuttle in position to bear down upon a carcass and core to hold said carcass and core upon the supporting means in a substantially upright position, means for imparting rotative movements to the shuttle, means for driving the supporting means of the core and carcass to impart rotative movements thereto, and means for causing the simultaneous separation or approach of the supporting means for the core and carcass to maintain cores of different sizes with the portion traversing the shuttle substantially central thereto.

5. A tire wrapping machine comprising a basic member and superstructure, a hollow rotatable shuttle mounted on the basic member, carriages on the basic member at opposite ends of the shuttle, rotatable supports for a core and tire carcass thereon mounted on the carriages, driving means for the supports, means for adjusting the carriages toward and from the shuttle, a drive shaft mounted on the superstructure, a pulley on the drive shaft, a belt carried by the pulley and encircling the shuttle in underriding relation thereto, driving connections between the drive shaft and the driving means for the core supporting devices on the carriages, and a guide member mounted on the superstructure in position to engage a core and tire carcass thereon traversing the shuttle, said guide member having a constant tendency to remain in engagement with the core and tire carcass.

6. In a machine for wrapping tires, a shuttle, underriding supports for sustaining the tire core and carcass in an upright position comprising carriages at opposite ends of the shuttle each provided with a rotatable driving support for the tire core and carcass, an elongated driving means for the rotatable supports, means for adjusting both carriages simultaneously toward or from the shuttle, and an overrunning follower for engaging the core and carcass on the top portion thereof.

7. In a machine for wrapping tires, a rotatable shuttle mounted for rotation upon a substantially horizontal axis, carriages at opposite sides of the shuttle and each having thereon a rotatable support for the tire core and carcass to sustain said tire core and carcass at spaced points in an upright position in traversing relation to and extending above the shuttle, means for adjusting both carriages simultaneously toward and from each other, and driving means common to both rotatable supports.

8. In a tire wrapping machine, a rotatable ring-shaped shuttle provided with a peripheral belt face and circumferentially extended edge guides on opposite sides of the shuttle defining between them a path for a driving belt for the shuttle.

In testimony, that I claim the foregoing as my own, I have hereto affixed my signature in the presence of two witnesses.

ALBERT H. FISHER.

Witnesses:
HARRY W. LANSING,
C. F. RIDDLE.